(12) United States Patent
Irish et al.

(10) Patent No.: US 7,028,579 B2
(45) Date of Patent: Apr. 18, 2006

(54) OVER-MOLD LEVER

(75) Inventors: Stephen Irish, Coventry (GB); Nicholas Vinsonneau, St. Remy la Varenne (FR)

(73) Assignee: Nsk Steering Systems Europe Limited, Nottinghamshire (GB)

( * ) Notice: Subject to any disclaimer, the term of this patent is extended or adjusted under 35 U.S.C. 154(b) by 0 days.

(21) Appl. No.: 10/147,044

(22) Filed: May 17, 2002

(65) Prior Publication Data

US 2002/0175512 A1 Nov. 28, 2002

(30) Foreign Application Priority Data

May 23, 2001 (GB) .................................. 0112680.4

(51) Int. Cl.
*B62D 1/18* (2006.01)
*F16H 53/00* (2006.01)

(52) U.S. Cl. .............................. 74/493; 74/56; 74/531; 74/567; 403/374.5

(58) Field of Classification Search .................. 74/523, 74/531, 567, 568 R, 492, 493, 495; 280/775, 280/776; 403/322.4, 374.1, 374.2, 374.4, 403/374.5
See application file for complete search history.

(56) References Cited

U.S. PATENT DOCUMENTS 3,811,718 A * 5/1974 Bates ......................... 292/241
4,244,237 A * 1/1981 Sprunger ...................... 74/493
5,117,707 A * 6/1992 Kinoshita et al. ............. 74/493
5,213,004 A * 5/1993 Hoblingre ..................... 74/493
5,390,956 A * 2/1995 Thomas ....................... 280/777
5,470,181 A * 11/1995 Garcia ......................... 409/134
5,509,325 A    4/1996 Thomas ....................... 74/493
5,570,610 A   11/1996 Cymbal ....................... 74/493
5,598,741 A *  2/1997 Mitchell et al. ............. 74/493
5,743,150 A *  4/1998 Fevre et al. .................. 74/493
5,927,152 A *  7/1999 Marzio et al. ................ 74/493
6,167,867 B1 *  1/2001 Garrick ....................... 123/400
6,325,458 B1 * 12/2001 Rohee et al. ................ 297/367
6,520,043 B1 *  2/2003 Wang ....................... 74/473.15
6,523,432 B1 *  2/2003 Yamamoto et al. ........... 74/492

FOREIGN PATENT DOCUMENTS

GB  0 443 881  8/1991
GB  2 310 708  9/1997

\* cited by examiner

*Primary Examiner*—William C. Joyce
(74) *Attorney, Agent, or Firm*—Miles & Stockbridge P.C.

(57) ABSTRACT

An over-mold lever in particular for use in a clamping mechanism for a vehicle steering column, is preferably made primarily of plastics material and includes a main portion (1) a head (5) and a hand grip (4). The head (5) is molded over an integrated camming surface (2), which is provided with one or more, preferably four, raised camming portions (2A). The camming surface (2) is arranged for engagement with a corresponding camming surface of another cam component to operate the clamping mechanism.

13 Claims, 3 Drawing Sheets

OVER-MOLD LEVER

BACKGROUND OF THE INVENTION

This invention relates to an over-mold lever, such as an operating lever, in particular for use in an automotive application.

Known steering column assemblies for vehicles include means for rake and/or reach adjustment which allow the steering column to be moved forwards and backwards and/or up and down in order to suit the comfort of the driver. Such adjustment means incorporate a clamping mechanism operated by a lever to bring the adjustment means into and out of clamped and unclamped conditions.

A number of clamping mechanisms include cams incorporated in the operating end of the over-mold lever itself, these cams being rolling members fitted within the over-mold lever that run over camming surfaces of a facing component to clamp and unclamp the adjustment means.

SUMMARY OF THE INVENTION

According to the present invention, there is provided an over-mold lever having a pivot axis incorporating an integrated camming surface provided about-the pivot axis.

The over-mold lever can be part of a clamping mechanism for a vehicle steering column.

One end of the over-mold lever can comprise a head incorporating the pivot axis and integrated camming surface. The head may also incorporate one end of an operating member to operate a device. The device may be the aforementioned vehicle steering column clamping mechanism. The operating member may be a rod or bolt itself having a head mounted within the head of the over-mold lever and the integrated camming surface can be arranged at a surface of the head of the over-mold lever that surrounds the rod or bolt. The over-mold lever can have a hand grip at one end.

The over-mold lever may be made of a plastics material so that its head is molded about the integrated camming surface and/or operating member. The camming surface may also be made of a plastics material, which could be of a different type to that of the head of the over-mold lever. Alternatively, the camming surface may be metallic.

The camming surface may comprise at least one, two, three or four raised cam portions for engagement with at least one other camming surfaces.

BRIEF DESCRIPTION OF THE DRAWINGS

For a better understanding of the invention and to show how the same may be carried into effect, reference will now be made, by way of example, to the accompanying drawings, in which.

DETAILED DESCRIPTION OF THE PREFERRED EMBODIMENTS

Figure 1:
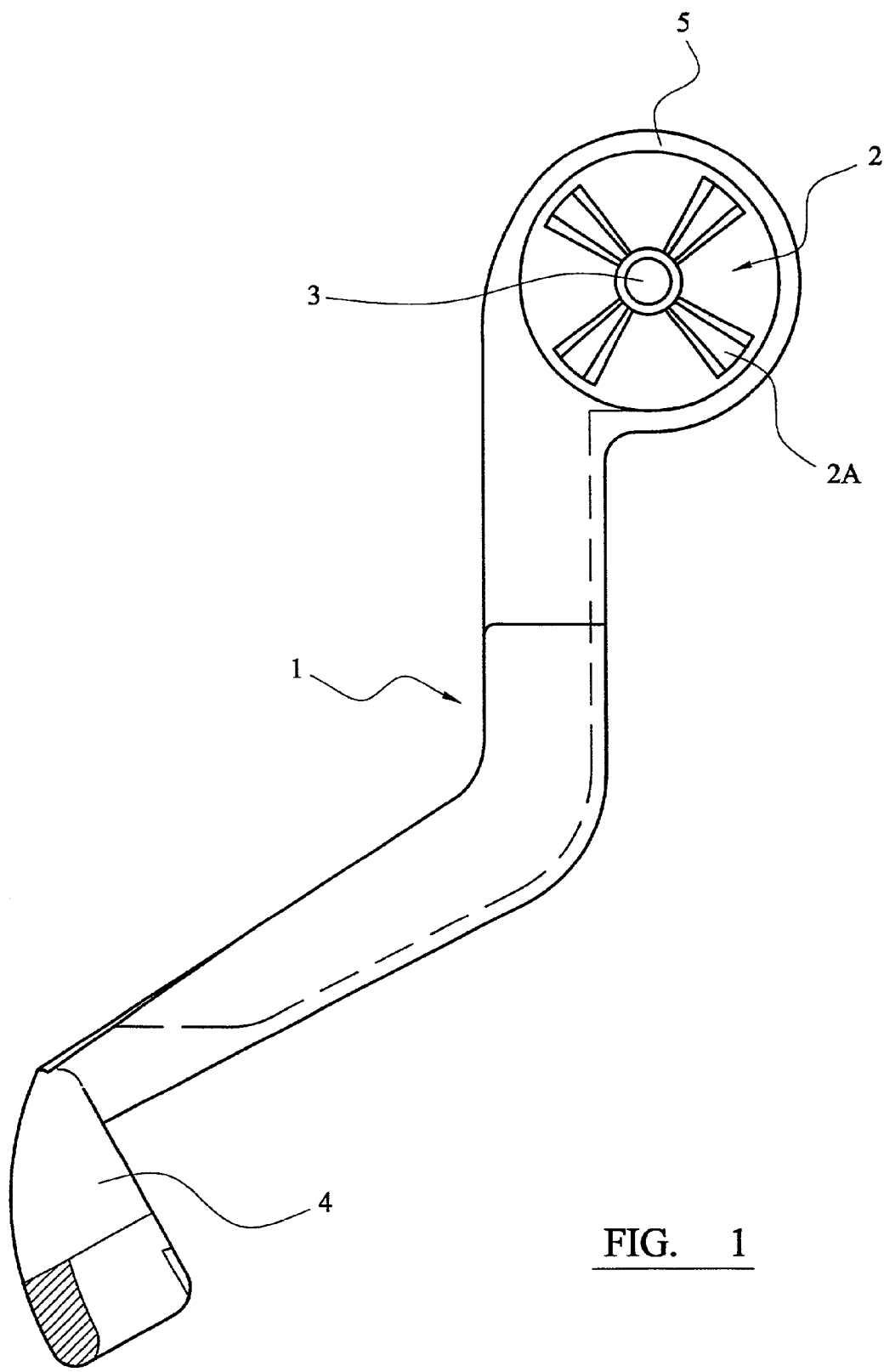
FIG. 1 is a diagrammatic side view of an operating lever.
Figure 2:
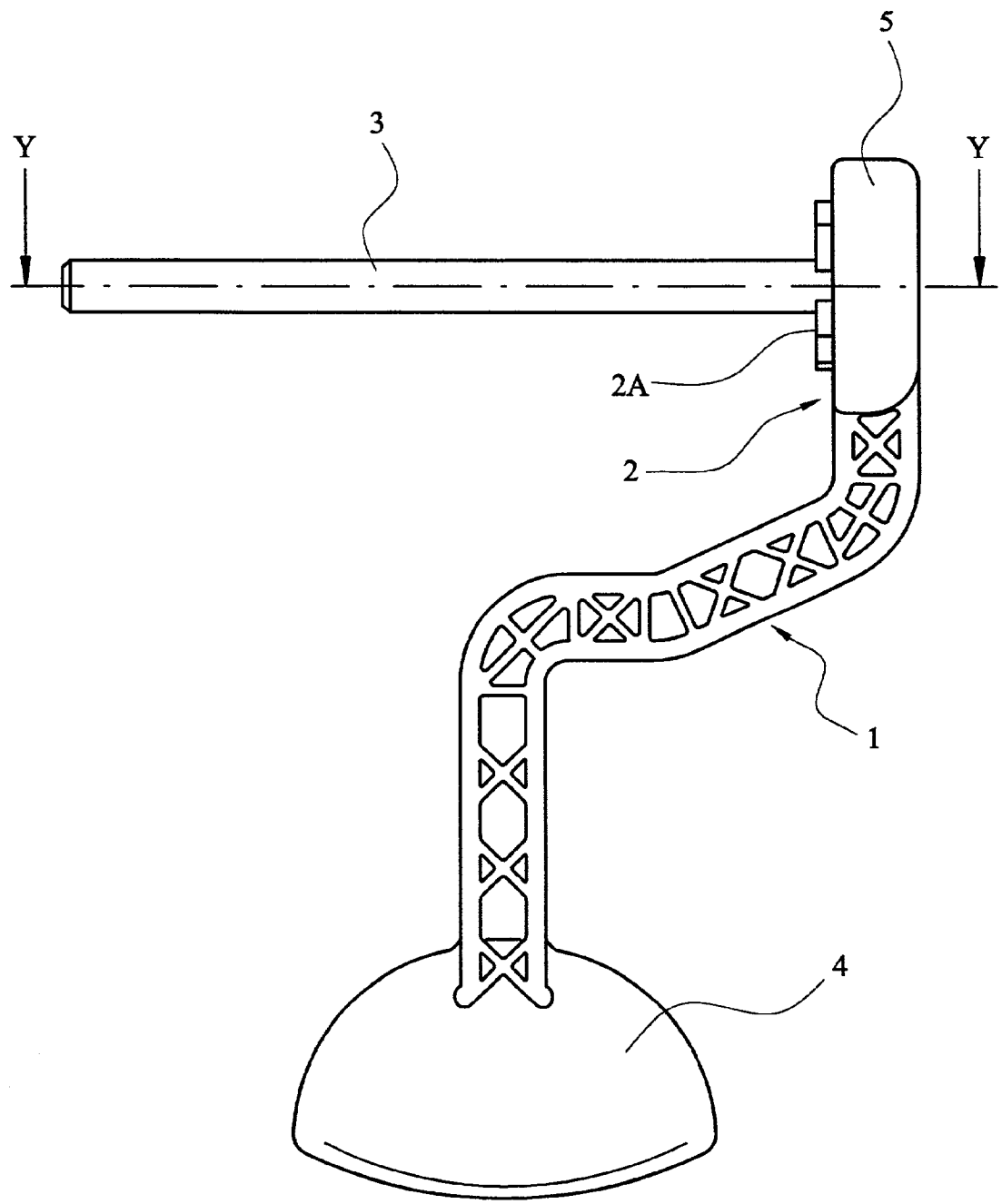
FIG. 2 is a plan view of the over-mold lever shown in FIG. 1.
Figure 3:
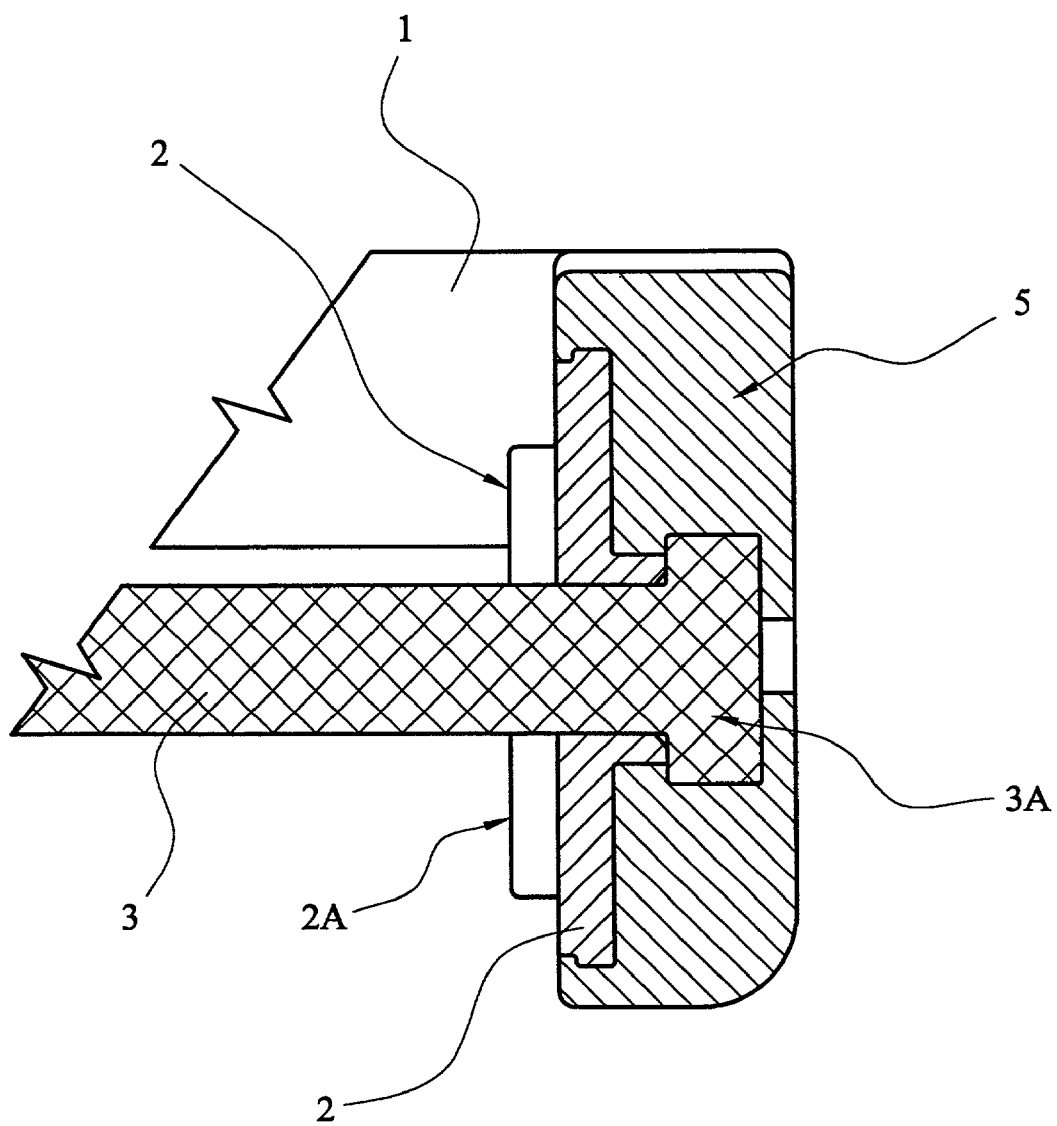
FIG. 3 is a section, partly cut-away, taken along line Y—Y in FIG. 2.

The drawings show over-mold lever 1 incorporating an integrated camming surface component 2 and an operating member in the form of a metal rod or bolt 3.

The over-mold lever 1 is of plastics material and is provided at one end with a hand grip 4 and a head 5 at its other end which is molded over the camming surface component 2, which is of a plastics or metallic material, for example. As shown in the drawings, there are four raised portions 2A of the camming surface component for engagement with another cam component (not shown) that, when the over-mold lever is installed, would face and bear on the camming surface component 2 (surrounding the operating member 3). The operating member 3 is, in use, placed under tension so as to draw the camming surfaces together to bear on one another. It will be noted that the operating member in the form of the lever or bolt 3 is provided with a head 3A over which the head 5 of the lever 1 is molded so as to provide an anchorage within the lever 1.

It will be appreciated that the present structure eliminates clearances between the parts resulting in an improved adjustment feel to the user of the lever and reduction of vibration problems in the assembly, especially where the over-mold lever is part of a vehicle steering column clamping mechanism, whilst also reducing the number of components, as compared with known assemblies.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. An over-mold comprising:
an over-molded head disposed at one end of the lever, said over-molded head having one end of an operating member and a camming surface component integrally molded therein, with the operating member being adapted to operate a device by movement about a pivot axis, and the camming surface component being provided about the pivot axis with the camming surface oriented to provide a force in a direction of the pivot axis when rotated in engagement with another camming surface.

2. The over-mold lever according to claim 1, further comprising:
a hand grip disposed at the other end of the over-mold lever.

3. The over-mold lever according to claim 1, wherein the device is a vehicle steering column clamping mechanism.

4. The over-mold according to claim 1, wherein the operating member is a rod or bolt having a head portion integrally molded within the over-molded head, and the camming surface component has a portion arranged at a surface of the over moulded head that surrounds the rod or bolt.

5. The over-mold lever according to claim 4, wherein the device is a vehicle steering column clamping mechanism.

6. The over-mold lever according to claim 1, wherein the over-mold lever is made wholly of plastics material.

7. The over-mold lever according to claim 1, wherein the camming surface component is made of metallic material.

8. The over-mold lever according to claim 1, wherein the camming surface component comprises at least one raised cam portion for engagement with at least one other camming surface.

9. An actuating device for a vehicle steering column clamping mechanism, said actuating device comprising:
an operating rod adapted to operate said vehicle steering column clamping mechanism, said operating rod having a head at an end thereof, and a lever having an over-molded ever moulded head at an end thereof, said over-molded head having said head of said operating rod and a camming surface component surrounding said operating rod integrally molded therein with the camming surface oriented to provide a force in a direction of the pivot axis when rotated in engagement with another camming surface.

10. The actuating device of claim 9, further comprising:
a hand grip disposed at another end of said lever.

11. The actuating device of claim 9, wherein said lever is made of plastics material.

12. The actuating device of claim 9, wherein said camming surface component is made of metal.

13. The actuating device of claim 9, wherein said camming surface component comprises at least one raised cam portion for engagement with at least one other camming surface.

* * * * *